(12) United States Patent
    Lehman

(10) Patent No.: US 12,697,838 B2
(45) Date of Patent: Aug. 4, 2026

(54) SELF-SEALING AUTOMOTIVE SPOKE WHEEL NIPPLE

(71) Applicant: DNA Specialty, Compton, CA (US)

(72) Inventor: Gerald Lehman, Compton, CA (US)

(73) Assignee: DNA Specialty, Compton, CA (US)

( * ) Notice: Subject to any disclaimer, the term of this patent is extended or adjusted under 35 U.S.C. 154(b) by 514 days.

(21) Appl. No.: 18/296,903

(22) Filed: Apr. 6, 2023

(65) Prior Publication Data

US 2023/0322018 A1     Oct. 12, 2023

Related U.S. Application Data

(60) Provisional application No. 63/329,539, filed on Apr. 11, 2022.

(51) Int. Cl.
    *B60B 1/04*          (2006.01)

(52) U.S. Cl.
    CPC .................................... *B60B 1/047* (2013.01)

(58) Field of Classification Search
    CPC ........................ B60B 1/047; B60B 2900/5116
    USPC ......................................................... 301/58
    See application file for complete search history.

(56) References Cited

U.S. PATENT DOCUMENTS

| | | | | |
|---|---|---|---|---|
| 6,736,462 B1 * | 5/2004 | Okajima | ................. | B60B 1/041 |
| | | | | 301/58 |
| 6,938,962 B1 * | 9/2005 | Schlanger | ............. | B60B 21/062 |
| | | | | 301/58 |
| 7,448,696 B2 * | 11/2008 | Meggiolan | .............. | B60B 1/041 |
| | | | | 301/58 |
| 8,251,459 B2 * | 8/2012 | Mason | .................. | B60B 21/064 |
| | | | | 301/58 |
| 11,148,466 B2 * | 10/2021 | Meggiolan | .............. | B60B 1/041 |
| 2005/0110333 A1 * | 5/2005 | Tien | ...................... | B60B 21/062 |
| | | | | 301/58 |
| 2007/0057566 A1 * | 3/2007 | Cappellotto | ............ | B60B 1/041 |
| | | | | 301/58 |
| 2010/0084909 A1 * | 4/2010 | Mason | ................... | B60B 1/041 |
| | | | | 301/58 |
| 2010/0096907 A1 * | 4/2010 | Cappellotto | .......... | B60B 21/068 |
| | | | | 301/58 |

(Continued)

FOREIGN PATENT DOCUMENTS

| | | | | | |
|---|---|---|---|---|---|
| BR | 112017003062 B1 * | 3/2021 | ............. | B60B 23/10 |
| EP | 0615865 A1 * | 9/1994 | ............. | B60B 21/12 |

(Continued)

*Primary Examiner* — S. Joseph Morano
*Assistant Examiner* — Eva L Comino

(57)          ABSTRACT

A self-sealing automotive spoke wheel nipple includes a spoke nipple and an elastic gasket. The spoke nipple that mounts the spoke into the rim includes a rotational axis, a head, a shank, and a spoke-engaging opening. The head, the shank, and the spoke-engaging opening are concentrically positioned along the rotational axis. The head is adjacently connected to the shank. The spoke-engaging opening traverses into the shank, opposite of the head so that the spoke can be threadedly engaged to the spoke nipple. The elastic gasket is laterally positioned around a shoulder portion of the shank and positioned adjacently to the head. The elastic gasket creates a hermetic connection between the rim and the spoke nipple as the elastic gasket completely seals the spoke opening of the rim during the installation process.

15 Claims, 8 Drawing Sheets

(56) References Cited

U.S. PATENT DOCUMENTS

2021/0162804 A1 * 6/2021 Werner .................. B60B 23/08

FOREIGN PATENT DOCUMENTS

| EP | 1897701 B1 * | 4/2011 | ........... B60B 1/0215 |
| JP | 2001213101 A * | 8/2001 | ........... B60B 21/066 |
| WO | WO-2005037573 A1 * | 4/2005 | ............ B60B 21/12 |
| WO | WO-2018001834 A1 * | 1/2018 | ........... B60B 21/068 |

* cited by examiner

SELF-SEALING AUTOMOTIVE SPOKE WHEEL NIPPLE

The current application claims a priority to the U.S. provisional patent application Ser. No. 63/329,539 filed on Apr. 11, 2022.

FIELD OF THE INVENTION

The present invention relates generally to spoke wheel nipples. More specifically, the present invention is a self-sealing automotive spoke wheel nipple that prevents leaks within a spoke wheel hole.

BACKGROUND OF THE INVENTION

Standard motorcycles and automotives that utilize spoke wheels are more forgiving on rough and uneven terrain as they are configured with an inner tube. Some spoke wheels utilize layers of liquid silicone to make the wheel tubeless and to prevent any air leaks about the spoke nipples. Unfortunately, many of these liquid silicone designs create a leaking situation if not properly installed. This results in the spoke wheel requiring extensive work to remove the liquid silicone and reapply the liquid silicone properly, to prevent any leaks. Furthermore, the process of applying the liquid silicone can be expensive and may require additional tools and controlled shop environment to eliminate dust and debris particles.

Therefore, an objective of the present invention is to provide users with a self-sealing automotive spoke wheel nipple that can help eliminate leaks. The present invention intends to provide users with a device that is self-sealing with a rubber seal for a spoke wheel. In order to accomplish that, a preferred embodiment of the present invention is configured with a spoke nipple and an integrated seal. Furthermore, the seal conforms to the recess of the spoke hole on the rim during installation. Resultantly, the present invention is able to completely eliminate nipple air leakage of the spoke wheels nipple without adding additional steps to the installation process.

SUMMARY OF THE INVENTION

The present invention is a self-sealing automotive spoke wheel nipple to provide users with a device that conforms to the recess of the spoke hole on the rim. In order to accomplish this the present invention comprises a spoke nipple that can be mechanically adjusted, and an integrated rubber seal that creates a hermetic connection with the spoke hole. Resultantly, the spoke nipple and the integrated rubber seal ensure that the spoke hole is properly sealed to prevent any air leaking.

DETAIL DESCRIPTIONS OF THE INVENTION

All illustrations of the drawings are for the purpose of describing selected versions of the present invention and are not intended to limit the scope of the present invention.

Figure 1:
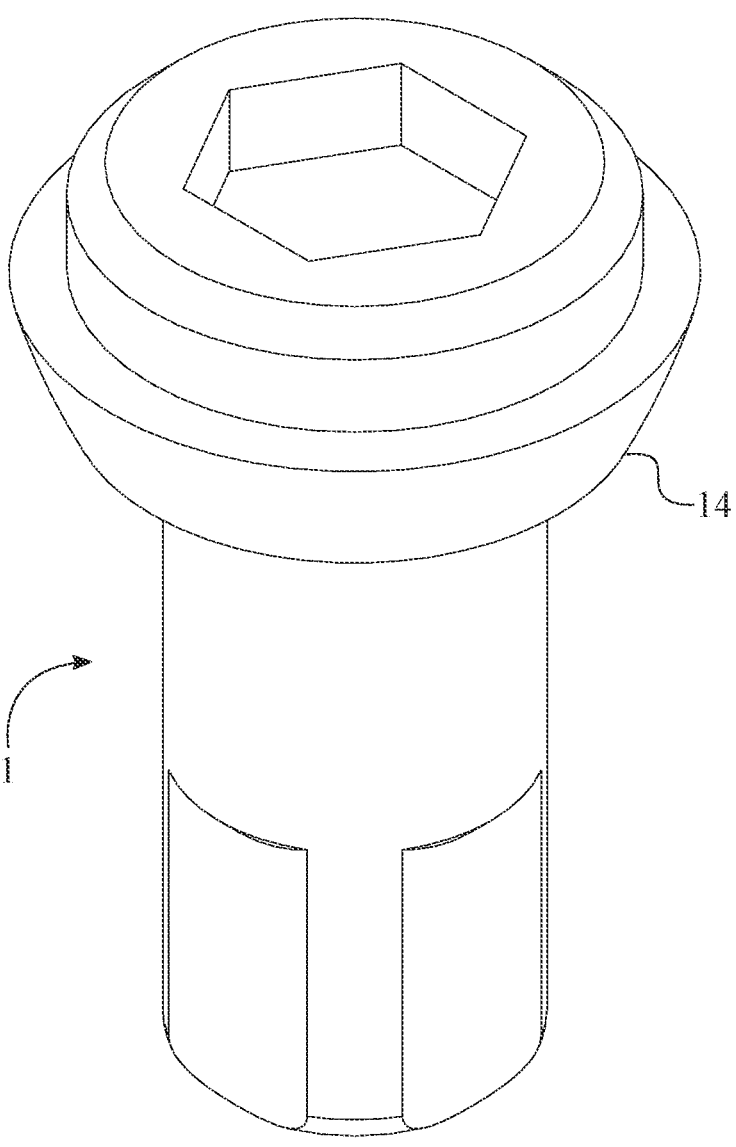
FIG. 1 is a top perspective view of the present invention.
Figure 2:
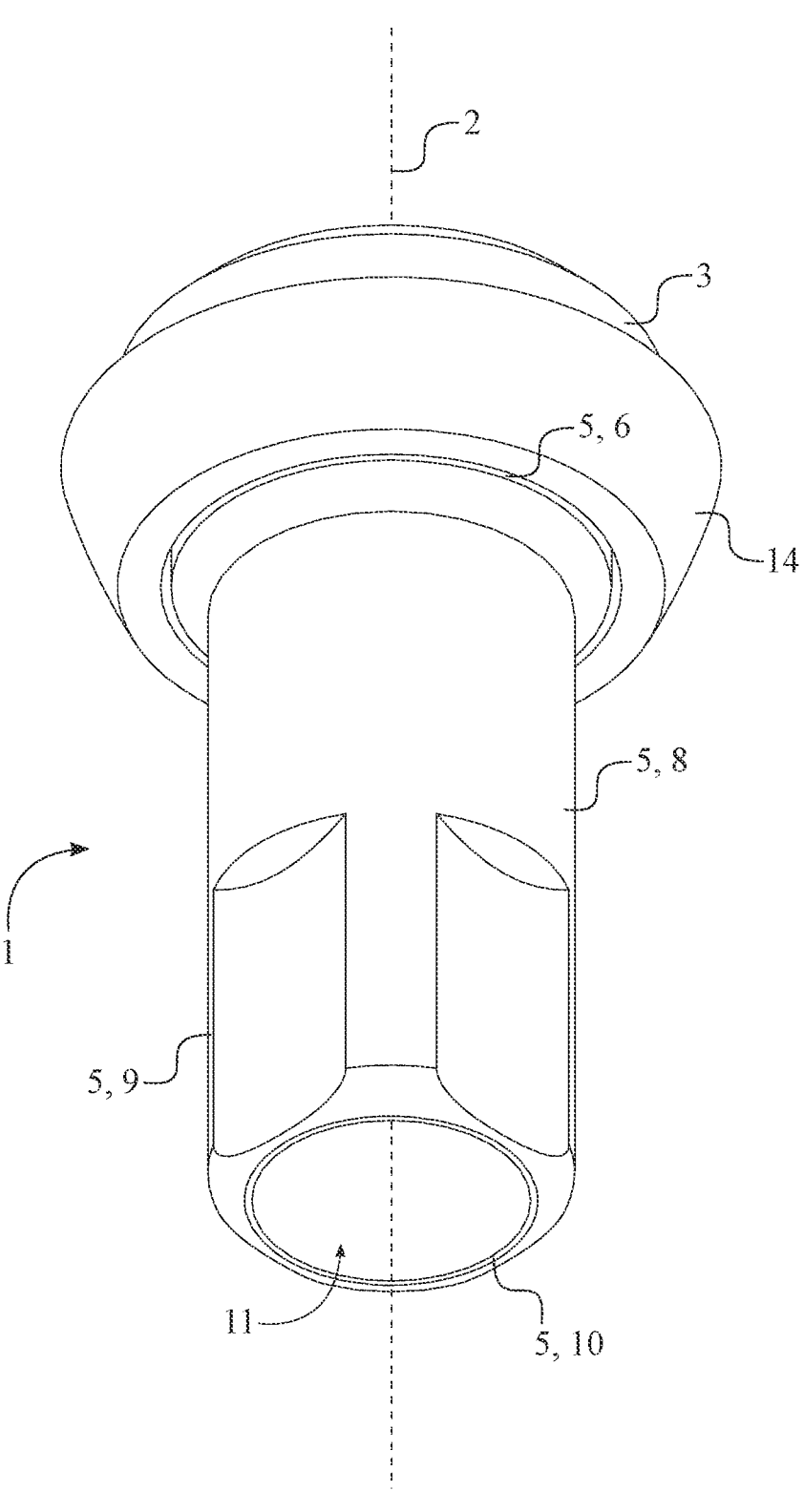
FIG. 2 is a bottom perspective view of the present invention.

The present invention is a self-sealing automotive spoke wheel nipple. An objective of the present invention is to provide users with a spoke wheel nipple that prevents leaks. The present invention intends to provide users with a device that is easily replaceable and eliminates the need for liquid silicone or inner wheel tubes. As shown in FIG. 1 and FIG. 2, the present invention comprises a spoke nipple 1 and an elastic gasket 14. The present invention can be installed, changed, or adjusted by utilizing standard tools and a spoke wrench.

In reference to the general configuration of the present invention, as shown in FIGS. 1, 2, 7, and 8, the spoke nipple 1 that mounts the spoke to the rim comprises a rotational axis 2, a head 3, a shank 5, and a spoke-engaging opening 11. The head 3, the shank 5, and the spoke-engaging opening 11 are concentrically positioned along the rotational axis 2 as the general circular shape of the spoke nipple 1 is defined. More specifically, the head 3 is adjacently connected to the shank 5 so that the head 3 can function as the engagement body between the rim and the spoke nipple 1 as the shank 5 is inserted through the spoke hole of the rim. For example, when the spoke nipple 1 is installed, the head 3 is pressed against the rim and positioned in between the tire and the inside surface of the rim. Simultaneously, the shank 5 is able to traverse through the spoke hole and orient towards the wheel hub. The spoke-engaging opening 11 traverses into the shank 5, opposite of the head 3. As a result, the spoke-engaging opening 11 is able to threadedly mount with the spoke that extends from the wheel hub. The elastic gasket 14 is laterally positioned around a shoulder portion 6 of the shank 5 and adjacently positioned to the head 3. The elastic gasket 14 functions as an airtight ring between the spoke nipple 1 and the spoke hole to ensure a hermetic connection between the spoke nipple 1 and the rim.

Figure 3:
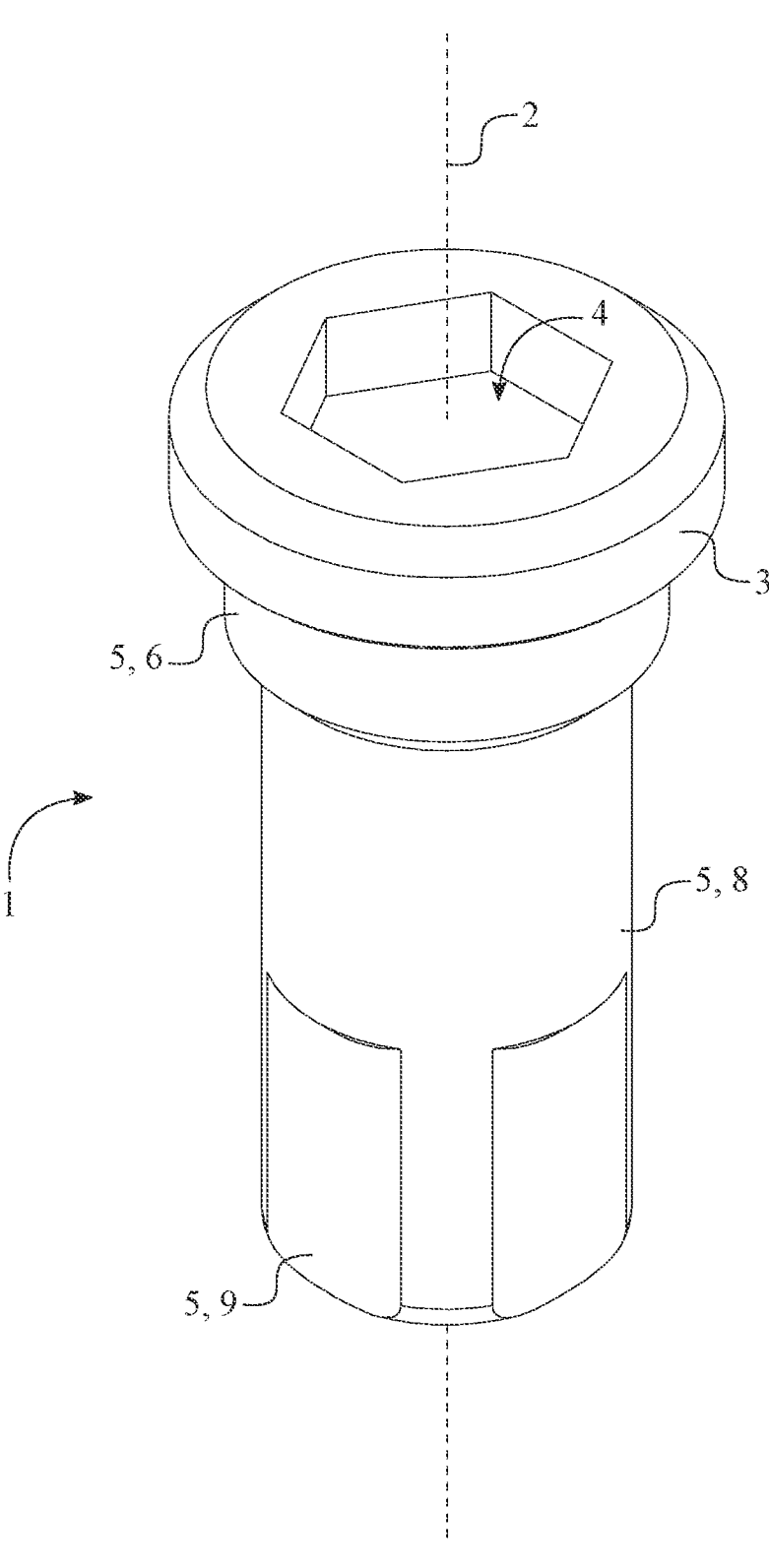
FIG. 3 is a top perspective view of the spoke nipple of the present invention.

In reference to FIG. 3, the present invention may further comprise a drive opening 4. The drive opening 4 is concentrically positioned to the rotational axis 2 and traverses into the head 3, opposite of the spoke-engaging opening 11. More specifically, the drive opening 4 enables the spoke nipple 1 to be rotated with a standard wrench or Allen wrench. The drive opening 4 is preferably formed into a hexagonal opening so that a hexagonal wrench or a hexagonal drive-bit can rotate the spoke nipple 1.

Figure 4:
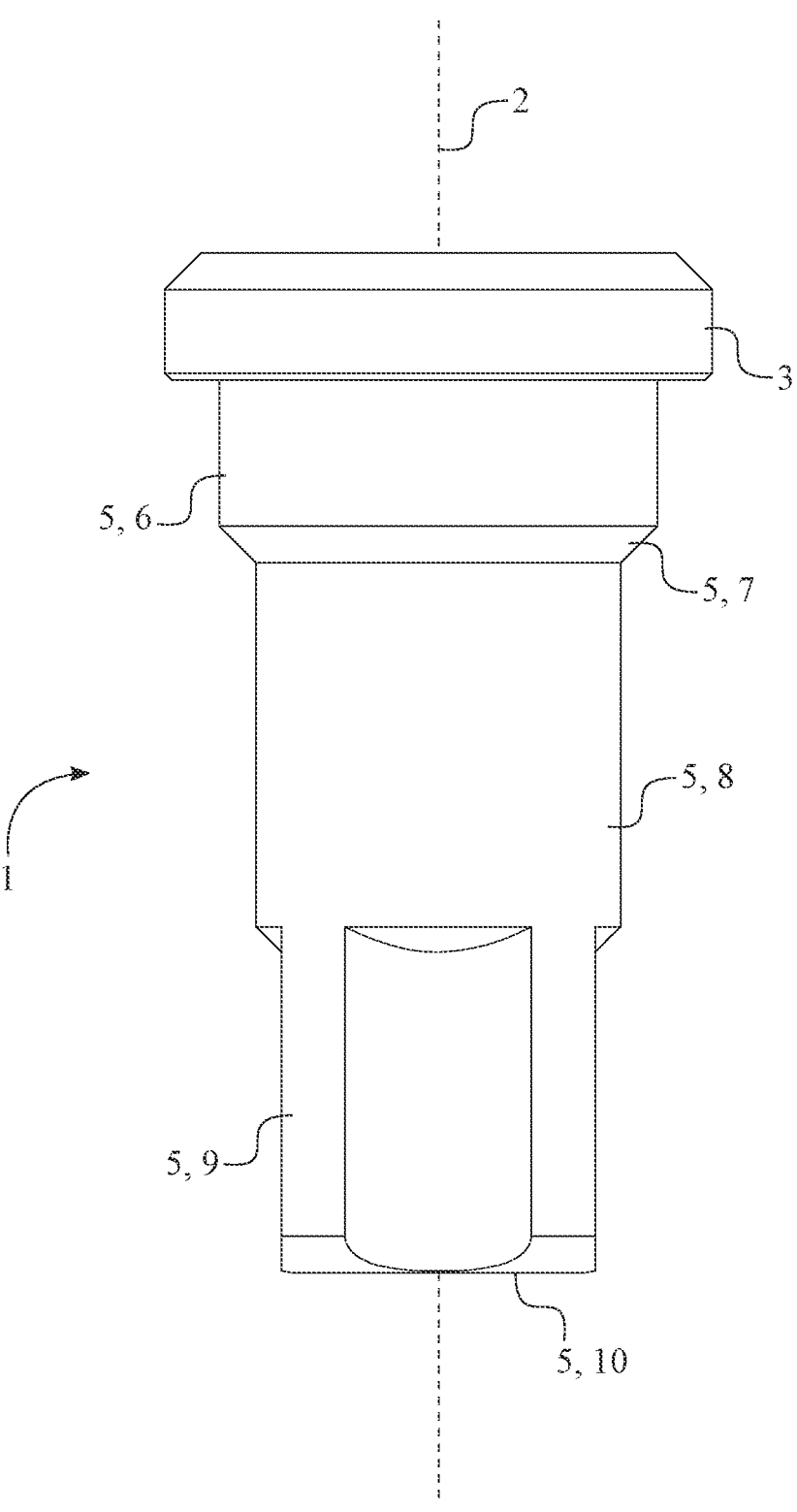
FIG. 4 is a side view of the spoke nipple of the present invention.

In reference to FIG. 4, the shank 5 may further comprise a chamfer portion 7, an elongated portion 8, and a wrench-receiving portion 9, in addition to the shoulder portion 6. More specifically, the shoulder portion 6, the chamfer portion 7, the elongated portion 8, and the wrench-receiving portion 9 are concentrically positioned along the rotational axis 2 thus forming the shank 5 into a tubular body. The shoulder portion 6 is adjacently connected to the head 3 thus providing sufficient surface area to attach the elastic gasket 14 to the spoke nipple 1. The chamfer portion 7 and the head 3 are oppositely positioned of each other about the shoulder portion 6 as the chamfer portion 7 is adjacently connected to the shoulder portion 6. The chamfer portion 7 concentrically guide the spoke nipple 1 through the spoke hole during the installation process so that the shoulder portion 6 can be centrally positioned within the spoke hole. The elongated portion 8 and the shoulder portion 6 are oppositely positioned of each other about the chamfer portion 7 as the elongated portion 8 is adjacently connected to the chamfer portion 7. The elongated portion 8 functions as the main structural body that threadedly engages with the spoke during installation. The wrench-receiving portion 9 and the chamfer portion 7 are oppositely positioned of each other about the elongated portion 8 as the wrench-receiving portion 9 is adjacently connected to the elongated portion 8. The wrench-receiving portion 9 functions allows the spoke wrench to be engaged with the shank 5 during the installation process so that the spoke nipple 1 can be rotated.

Figure 8:
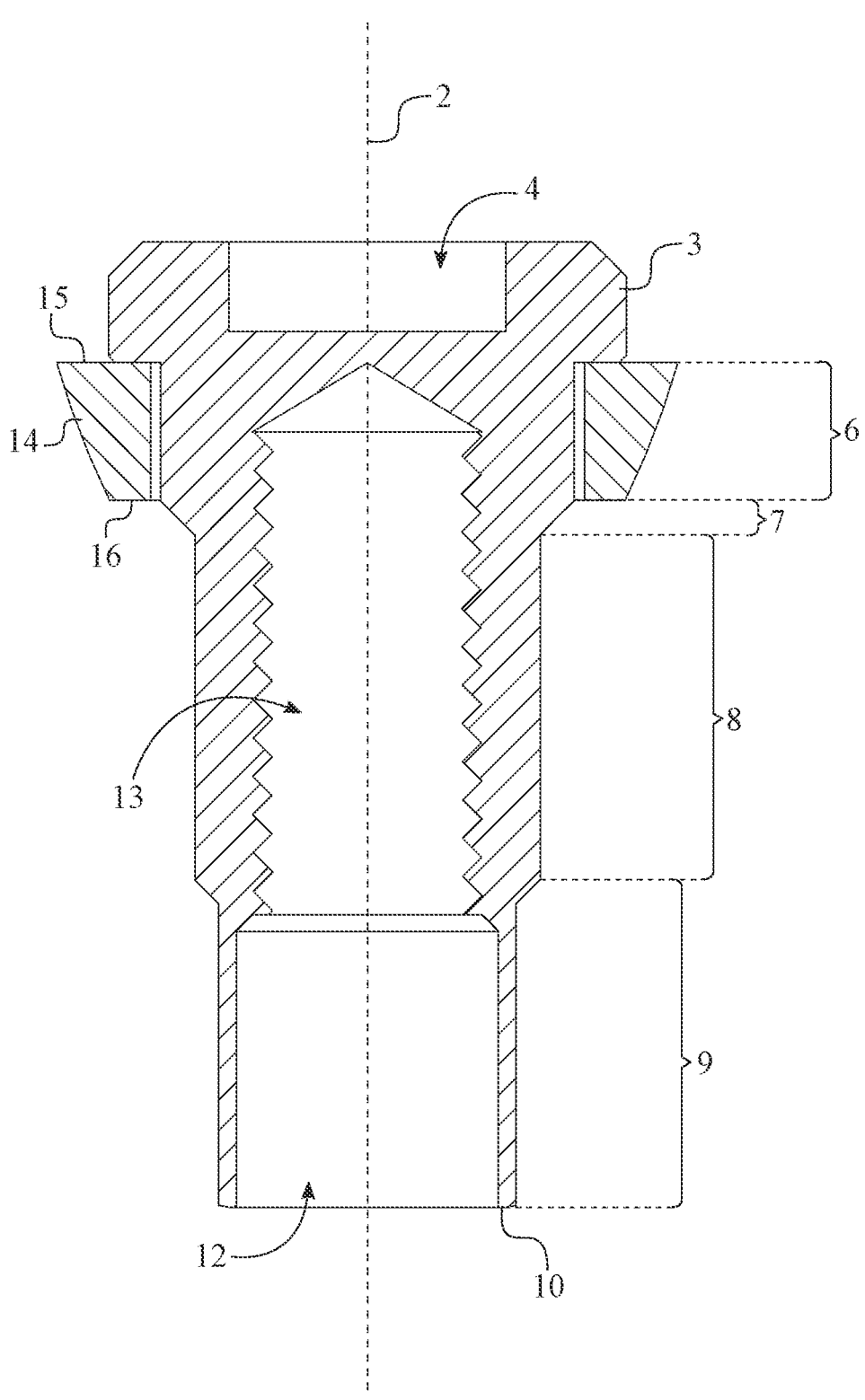
FIG. 8 is a cross-section view of the present invention taken along line 8-8 in FIG. 7.

In reference to FIG. 8, the spoke-engaging opening 11 may comprise a bore section 12 and a threaded section 13 to facilitate the engagement of the spoke. More specifically, the bore section 12 is extended from a free edge 10 shank 5 to the wrench-receiving portion 9 and stops immediately before the elongated portion 8. The threaded section 13 is extended from the wrench-receiving portion 9 to the shoulder portion 6 as the threaded section 13 fully traverses through the elongated portion 8. Furthermore, an inner diameter of the bore section 12 is larger than an inner diameter of the threaded section 13 so that a threaded end of the spoke can be easily inserted into the spoke nipple 1 before the threaded end of the spoke is engaged with the threaded section 13. Furthermore, the threaded section 13 stops within the shoulder portion 6 and does not penetrate into the head 3 thus structurally strengthening the connection between the shoulder portion 6 and the head 3.

Figure 5:
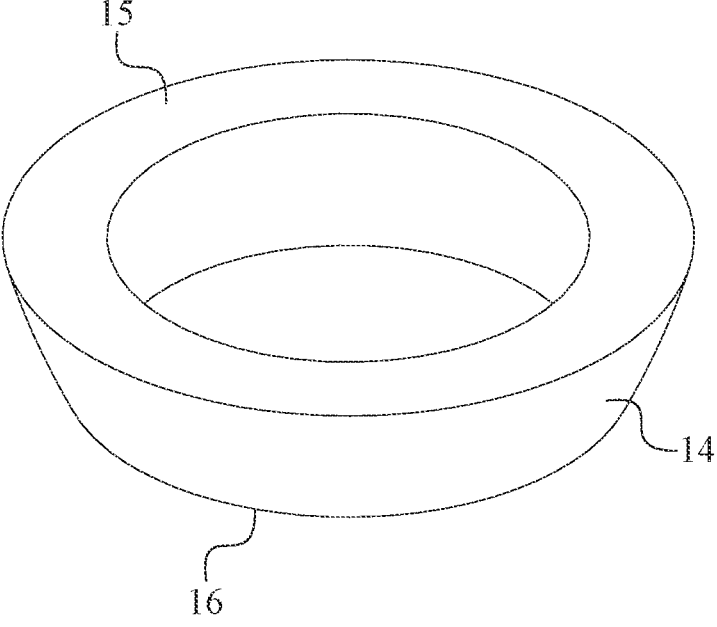
FIG. 5 is a top perspective view of the elastic gasket of the present invention.
Figure 6:
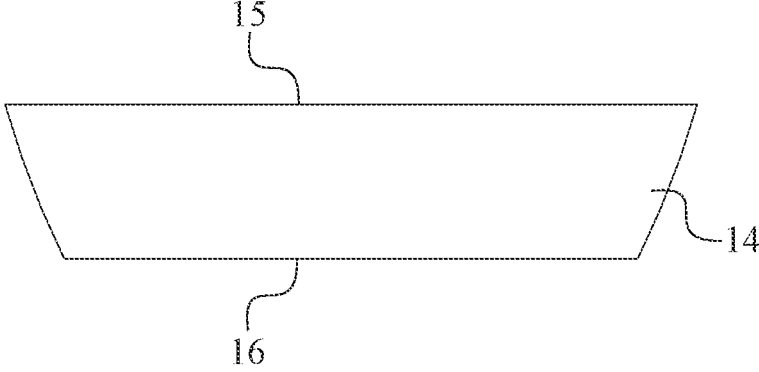
FIG. 6 is a side view of the elastic gasket of the present invention.
Figure 7:
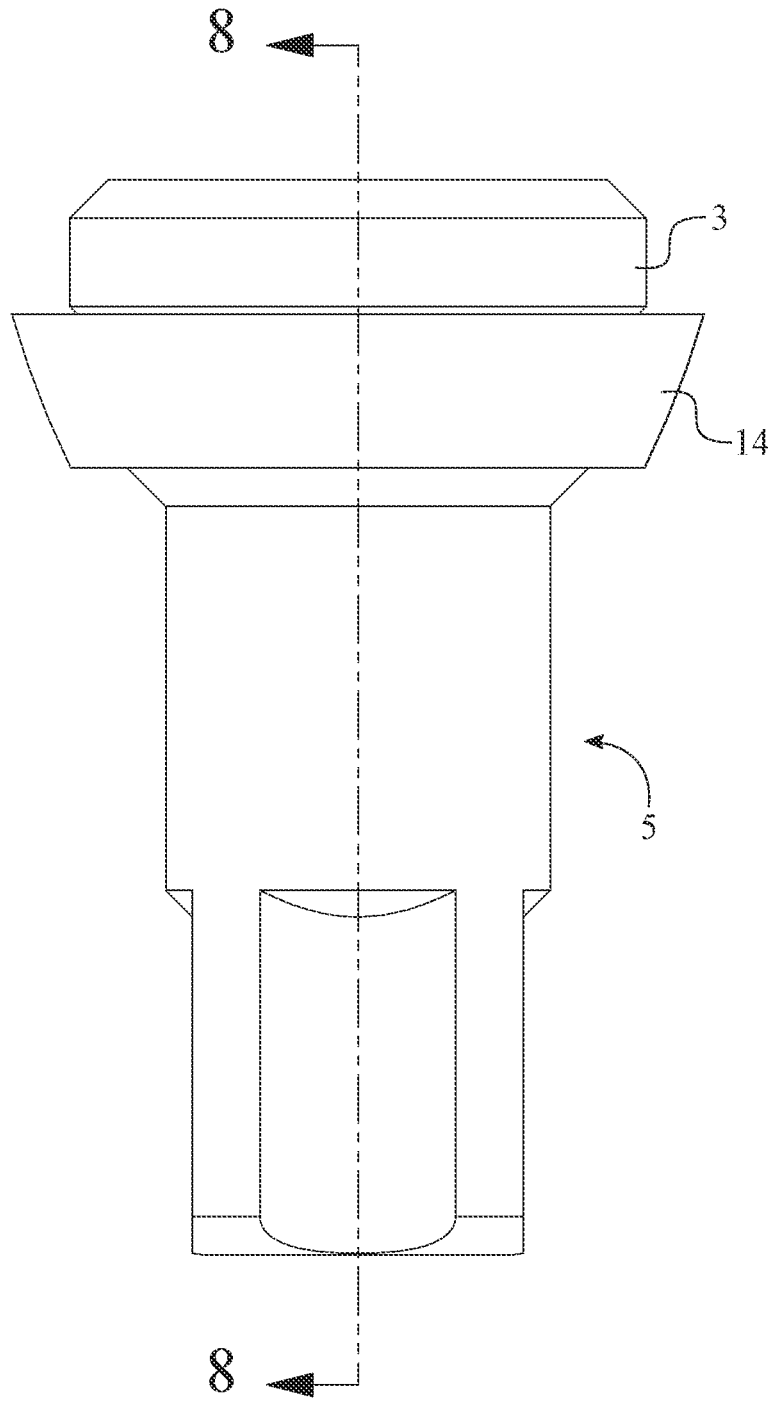
FIG. 7 is a side view of the present invention.

In reference to FIGS. 5, 6, and 8, the shoulder portion 6 is radially encircled by the elastic gasket 14 as the elastic gasket 14 is radially extended from the head 3 to the chamfer portion 7. The elastic gasket 14 is a tapered body that engaged towards the chamfer portion 7 to ensure a sealed fit within the spoke hole. More specifically, a first radial edge 15 of the elastic gasket 14 is adjacently positioned to the head 3. A second radial edge 16 of the elastic gasket 14 is adjacently positioned to the chamfer portion 7. As a result, the elastic gasket 14 further compressed to ensure the spoke nipple 1 and spoke hole has no leak. Furthermore, if an air leak occurs, the rider can easily utilize a standard wrench or a spoke wrench about the wrench-receiving portion 9 to tighten the elastic gasket 14 in place through the rotation of the spoke nipple 1. The elastic gasket 14 is preferably made with a rubber material with a ring shape design. Furthermore, an outer diameter of the first radial edge 15 is larger than an outer diameter of the head 3 so that the head 3 is able to fully compress the elastic gasket 14 against the inside surface of the rim.

With all the components working in tandem with each other it can be seen that, the present invention is a self-sealing automotive spoke wheel nipple that prevent air leaks and eliminate the usage of liquid silicone or inner wheel tubes.

Although the invention has been explained in relation to its preferred embodiment, it is to be understood that many other possible modifications and variations can be made without departing from the spirit and scope of the invention as hereinafter claimed.

What is claimed is:

1. A self-sealing automotive spoke wheel nipple comprising:
    a spoke nipple;
    an elastic gasket;
    a drive opening;

the spoke nipple comprising a rotational axis, a head, a shank, and a spoke-engaging opening;
    the head, the shank, and the spoke-engaging opening being concentrically positioned along the rotational axis;
    the head being adjacently connected to the shank;
    the spoke-engaging opening traversing into the shank, opposite of the head;
    the elastic gasket being laterally positioned around a shoulder portion of the shank;
    the elastic gasket being adjacently positioned to the head;
    the drive opening being concentrically positioned to the rotational axis;
    the drive opening traversing into the head, opposite of the spoke-engaging opening; and
    a closed bottom surface of the drive opening being positioned within the head, offset from the shoulder portion.

2. The self-sealing automotive spoke wheel nipple as claimed in claim 1 comprising:
    the shank further comprising a chamfer portion, an elongated portion, and a wrench-receiving portion;
    the shoulder portion, the chamfer portion, the elongated portion, and the wrench-receiving portion being concentrically positioned along the rotational axis;
    the shoulder portion being adjacently connected to the head;
    the chamfer portion being adjacently connected to the shoulder portion;
    the chamfer portion and the head being oppositely positioned of each other about the shoulder portion;
    the elongated portion being adjacently connected to the chamfer portion;
    the elongated portion and the shoulder portion being oppositely positioned of each other about the chamfer portion;
    the wrench-receiving portion being adjacently connected to the elongated portion;
    the wrench-receiving portion and the chamfer portion being oppositely positioned of each other about the elongated portion;
    an outer annular surface of the shoulder portion being positioned parallel and along the rotation axis;
    a radius between the outer annular surface of the shoulder portion and the rotation axis being less than a radius between an outer annular surface of the head and the rotation axis; and
    a radius between the outer annular surface of the shoulder portion and the rotation axis being greater than a radius between an outer annular surface of the chamfer portion and the rotation axis.

3. The self-sealing automotive spoke wheel nipple as claimed in claim 1 comprising:
    the spoke-engaging opening comprising a bore section and a threaded section;
    the shank further comprising a wrench-receiving portion and a free edge;
    the bore section being extended from the free edge to the wrench-receiving portion; and
    the threaded section being extended from the wrench-receiving portion to the shoulder portion.

4. The self-sealing automotive spoke wheel nipple as claimed in claim 1 comprising:
    the shoulder portion being radially encircled by the elastic gasket; and
    the elastic gasket being radially extended from the head to a chamfer portion of the shank.

5. The self-sealing automotive spoke wheel nipple as claimed in claim 4, wherein the elastic gasket is a tapered body.

6. The self-sealing automotive spoke wheel nipple as claimed in claim 4 comprising:

the elastic gasket comprising a first radial edge and a second radial edge;

the first radial edge being positioned coincident to an intersection between the head and the shoulder portion;

the second radial edge being positioned coincident to an intersection between the shoulder portion and the chamfer portion; and a thickness of the elastic gasket between the first radial edge and the second radial edge being equal to a thickness of the shoulder portion along the rotation axis.

7. A self-sealing automotive spoke wheel nipple comprising:

a spoke nipple;

an elastic gasket;

a drive opening;

the spoke nipple comprising a rotational axis, a head, a shank, and a spoke-engaging opening;

the head, the shank, and the spoke-engaging opening being concentrically positioned along the rotational axis;

the head being adjacently connected to the shank;

the spoke-engaging opening traversing into the shank, opposite of the head;

the shank comprising a shoulder portion, a chamfer portion, an elongated portion, and a wrench-receiving portion;

the shoulder portion, the chamfer portion, the elongated portion, and the wrench-receiving portion being concentrically positioned along the rotational axis;

the shoulder portion being adjacently connected to the head;

the chamfer portion being adjacently connected to the shoulder portion;

the chamfer portion and the head being oppositely positioned of each other about the shoulder portion;

the elongated portion being adjacently connected to the chamfer portion;

the elongated portion and the shoulder portion being oppositely positioned of each other about the chamfer portion;

the wrench-receiving portion being adjacently connected to the elongated portion;

the wrench-receiving portion and the chamfer portion being oppositely positioned of each other about the elongated portion;

an outer annular surface of the shoulder portion being positioned parallel and along the rotation axis;

a radius between the outer annular surface of the shoulder portion and the rotation axis being less than a radius between an outer annular surface of the head and the rotation axis;

a radius between the outer annular surface of the shoulder portion and the rotation axis being greater than a radius between an outer annular surface of the chamfer portion and the rotation axis;

the elastic gasket being laterally positioned around the shoulder portion;

the elastic gasket being adjacently positioned to the head;

the drive opening being concentrically positioned to the rotational axis;

the drive opening traversing into the head, opposite of the spoke-engaging opening; and a closed bottom surface of the drive opening being positioned within the head, offset from the shoulder portion.

8. The self-sealing automotive spoke wheel nipple as claimed in claim 7 comprising:

the spoke-engaging opening comprising a bore section and a threaded section;

the shank further comprising a wrench-receiving portion and a free edge;

the bore section being extended from the free edge to the wrench-receiving portion; and the threaded section being extended from the wrench-receiving portion to the shoulder portion.

9. The self-sealing automotive spoke wheel nipple as claimed in claim 7 comprising:

the shoulder portion being radially encircled by the elastic gasket; and the elastic gasket being radially extended from the head to the chamfer portion.

10. The self-sealing automotive spoke wheel nipple as claimed in claim 9, wherein the elastic gasket is a tapered body.

11. The self-sealing automotive spoke wheel nipple as claimed in claim 9 comprising:

the elastic gasket comprising a first radial edge and a second radial edge;

the first radial edge being positioned coincident to an intersection between the head and the shoulder portion;

the second radial edge being positioned coincident to an intersection between the shoulder portion and the chamfer portion; and a thickness of the elastic gasket between the first radial edge and the second radial edge being equal to a thickness of the shoulder portion along the rotation axis.

12. A self-sealing automotive spoke wheel nipple comprising:

a spoke nipple;

an elastic gasket;

a drive opening;

the spoke nipple comprising a rotational axis, a head, a shank, and a spoke-engaging opening;

the head, the shank, and the spoke-engaging opening being concentrically positioned along the rotational axis;

the head being adjacently connected to the shank;

the spoke-engaging opening traversing into the shank, opposite of the head;

the shank comprising a shoulder portion, a chamfer portion, an elongated portion, and a wrench-receiving portion;

the shoulder portion, the chamfer portion, the elongated portion, and the wrench-receiving portion being concentrically positioned along the rotational axis;

the shoulder portion being adjacently connected to the head;

the chamfer portion being adjacently connected to the shoulder portion;

the chamfer portion and the head being oppositely positioned of each other about the shoulder portion;

the elongated portion being adjacently connected to the chamfer portion;

the elongated portion and the shoulder portion being oppositely positioned of each other about the chamfer portion;

the wrench-receiving portion being adjacently connected to the elongated portion;

the wrench-receiving portion and the chamfer portion being oppositely positioned of each other about the elongated portion;

an outer annular surface of the shoulder portion being positioned parallel and along the rotation axis;

a radius between the outer annular surface of the shoulder portion and the rotation axis being less than a radius between an outer annular surface of the head and the rotation axis;

a radius between the outer annular surface of the shoulder portion and the rotation axis being greater than a radius between an outer annular surface of the chamfer portion and the rotation axis;

the elastic gasket being laterally positioned around the shoulder portion;

the elastic gasket being adjacently positioned to the head;

the shoulder portion being radially encircled by the elastic gasket;

the elastic gasket being radially extended from the head to the chamfer portion;

the drive opening being concentrically positioned to the rotational axis;

the drive opening traversing into the head, opposite of the spoke-engaging opening; and a closed bottom surface of the drive opening being positioned within the head, offset from the shoulder portion.

13. The self-sealing automotive spoke wheel nipple as claimed in claim 12 comprising:

the spoke-engaging opening comprising a bore section and a threaded section;

the shank further comprising a wrench-receiving portion and a free edge;

the bore section being extended from the free edge to the wrench-receiving portion; and the threaded section being extended from the wrench-receiving portion to the shoulder portion.

14. The self-sealing automotive spoke wheel nipple as claimed in claim 12, wherein the elastic gasket is a tapered body.

15. The self-sealing automotive spoke wheel nipple as claimed in claim 12 comprising:

the elastic gasket comprising a first radial edge and a second radial edge;

the first radial edge being positioned coincident to an intersection between the head and the shoulder portion;

the second radial edge being positioned coincident to an intersection between the shoulder portion and the chamfer portion; and a thickness of the elastic gasket between the first radial edge and the second radial edge being equal to a thickness of the shoulder portion along the rotation axis.

* * * * *